Feb. 28, 1961 J. M. RANCK 2,972,988
AUTOMATIC CONTROL FOR ENGINE MIXTURES AND SPEED
Filed Feb. 19, 1960 5 Sheets-Sheet 5

*Fig. 7.*

INVENTOR.
Jack M. Ranck.
BY
Fishburn and Gold
ATTORNEYS.

United States Patent Office 2,972,988
Patented Feb. 28, 1961

2,972,988

AUTOMATIC CONTROL FOR ENGINE MIXTURES AND SPEED

Jack M. Ranck, Kansas City, Mo., assignor to Panhandle Eastern Pipe Line Company, Inc., Kansas City, Mo., a corporation of Delaware Filed Feb. 19, 1960, Ser. No. 9,844

10 Claims. (Cl. 123—120)

This invention relates to an automatic mixture and speed control system for internal combustion engines and more particularly to a method and apparatus for controlling the proportional quantities of air and fuel delivered to the cylinders of such an engine to obtain the desired optimum performance with the minimum fuel consumption consonant with such operation.

Various devices for controlling the fuel-air ratio and volume delivered to internal combustion engines are known. However, such devices do not afford optimum control for the reason that they either do not consider all the parameters which affect the operation of the engine, or they consider such parameters in a sketchy or imperfect manner.

It is, therefore, an object of the present invention to provide a control system which will accurately regulate the operation of an internal combustion engine while precisely considering all the relevant parameters which affect such operation.

Further objects of the present invention are: to provide a method of programming an internal combusion engine control appartus whereby said apparatus automatically responds with signals, which when translated into control adjustments, produce the optimum fuel-air ratio and volume charge for the particular conditions under which the engine is called upon to operate; to provide an apparatus for controlling the fuel-air ratio and volume charge entering the cylinders of an internal combustion engine which is automatically responsive to engine speed, manifold fuel temperature, manifold fuel pressure, manifold air temperature, and manifold air pressure; to provide a programmed engine control system which consists of a stable speed control network and a mixture control network which cooperate to produce control signals for optimum operation under any limitations of torque, speed and ambient fuel and air conditions within a useful range; to provide a sensitive control apparatus for an internal combustion engine which has smooth, non-hunting control signal outputs due to a cascade network of operative devices with appropriate response time constants; and to provide a method and apparatus for controlling internal combustion engines in which the amplification and differential manipulation of small variations in signals from speed, temperature and pressure monitoring devices produce precise fuel-air control information in accordance with a predetermined program.

A special feature of this invention is the provision in an automatic engine control apparatus of simple means to compensate for normal wear of the engine without an over-all recalibration of the control apparatus.

Other objects and advantages of this invention will become apparent from the following description taken in connection with the accompanying drawings, wherein are set forth by way of illustration and example certain embodiments of this invention.

Figure 1:
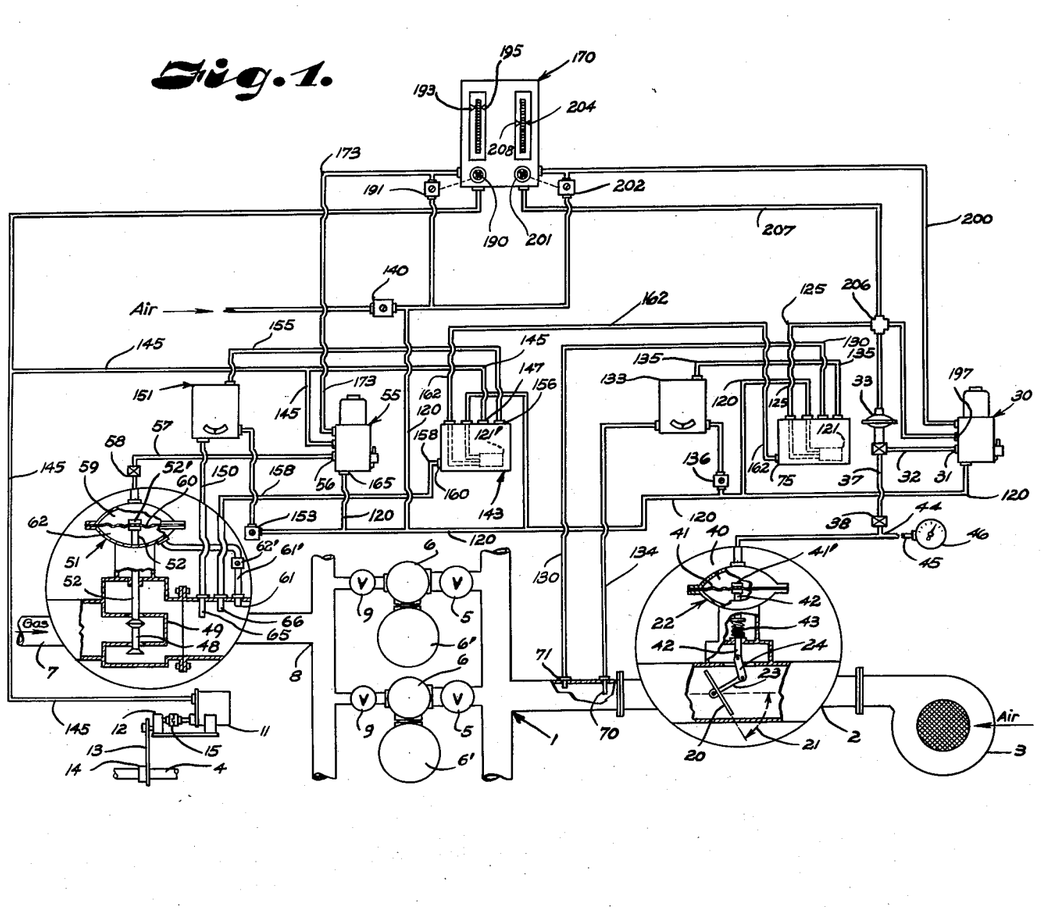
Fig. 1 is a diagrammatic view illustrating the employment of the present invention for the control of a supercharged gas engine.

Referring more particularly to the drawings:

1 designates the air manifold of an internal combustion engine operating upon a gaseous fuel. Air is supplied to the air manifold 1 through a duct 2 by means of a turbo-charger blower 3 driven through a connective means (not shown) by an engine exhaust expansion turbine (not shown). The air flowing into the air manifold 1 passes through air balance valves 5 before entering into the fuel mixing chambers 6 immediately prior to its entry into the combustion cylinders 6'. A duct 7 directs fuel gas from a suitable source of supply into the gas manifold 8, through fuel balance cocks 9 and into the fuel mixing chambers 6 where it is mixed with the air entering from the air manifold 1. Under some circumstances air balance valves 5 and fuel balance cocks 9 may be dispensed with, since, as will appear more fully hereinafter, they serve as adjustable restrictors to balance the charges entering the several cylinders which, in case of prior balance, is not necessary.

A hydraulic tachometer 11 is a speed sensing device of any of several well known designs which produces a pressure proportional to the speed of the engine camshaft 4. Since variations in load will initially affect engine speed, the tachometer 11 may also be considered an engine load variation detector. The tachometer 11 is driven through a speed increaser 12 by means of a belt or chain 13 operatively engaging a sheave 14 fixed upon the camshaft 4. A flexible rotating coupling 15 connects the tachometer 11 to the speed increaser 12. The pressure signal produced by the tachometer 11 controls the speed of the engine in a manner discussed hereinafter. A flow regulating air valve 20 is pivotally mounted in duct 2 preferably adjacent the entrance to the air manifold 1 to control the flow of air passing thereinto. The air valve 20 is maintained at an adjustable angular position 21 by an air valve control 22 which is connected therewith through connecting links 23 and 24. The air valve control 22 is actuated by a pneumatic pressure signal delivered by a mixture driver relay 30, the operation of which will be described hereinafter. The air valve control signal pressure delivered by the mixture driver relay 30 travels from the output port 31 through a pneumatic tube 32 to a safety valve 33. As long as safety valve 33 remains actuated by means described hereinafter, the pressure signal in tube 32 is shunted into the tube 37 through an open shut-off valve 38 and into the air valve control chamber 40 resulting in the deflection of the diaphragm 41. The diaphragm 41 connects by means of a coupling 41' to a slide rod 42 which pivotally engages the link 24. The slide rod 42 is biased in an upward direction by a spring 43 which returns valve 20 to an open position when safety valve 33 is deactuated. On the downstream side of the shut-off valve 38 is a fitting 44 carrying a branching tube 45 which communicates the pressure applied to the diaphragm 41 to an indicator 46 which is calibrated to act in response to said pressure to indicate the angular position 21 of the air valve 20.

The quantity of fuel or gas entering the combustion cylinders of the engine is controlled by means of a flow regulating fuel valve 48 axially moveable in cooperative relation to valve seat 49 which is positioned in duct 7 preferably adjacent the entrance to the gas manifold 8. The extent of flow past fuel valve 48 is controlled by a fuel valve control 51 through a slide rod 52 upon which the fuel valve 48 is mounted. The fuel valve control 51 is operated by means of a pneumatic pressure signal delivered by a speed driver relay 55 through the outlet port 56, into tube 57, past open shut-off valve 58 and into the upper diaphragm chamber 59 of the fuel valve control 51.

The gas pressure downstream from fuel valve 48 is tapped by a pressure tap 61 and introduced through tube 61' into a lower diaphragm chamber 62 on the opposite side of the flexible diaphragm 60 from the upper diaphragm chamber 59. The slide rod 52 is connected to diaphragm 60 with coupling 52' whereby the flexing of the diaphragm 60 produces an axial displacement of rod 52. The short feedback control loop formed by introducing downstream gas pressure into chamber 62 produces fast response with low deviation from the desired control setting and dampens the more rapid overcontrol irregularities in the downstream gas pressure, such dampening being controlled by the relative opening of valve 62', the longer period transient pressure irregularities being overcome in the speed driver relay 55, described in more detail hereinafter.

A temperature element 65 and a pressure tap 66 are located in the gas manifold to sense the temperature and pressure of the regulated gas, i.e., downstream from the flow regulating fuel valve 48. Similarly a temperature element 70 and a pressure tap 71 are located in the air manifold 1 to sense the air temperature and pressure downstream from the flow regulating air valve 20.

The procedure for collecting engine control data and the evaluation thereof will now be described. It is apparent from an examination of Fig. 1 that the conditions of the fuel and air, i.e., the temperature and pressure thereof, are monitored substantially in the condition they enter into the combustion cylinders; thus, the effect of any heat of compression caused by the turbo-charger 2, the effect of ambient air or fuel pressure changes, the effect of ambient air or fuel temperature changes, and the effect of aftercooling due to throttling caused by the valves 20 and 48 or other temperature and pressure changes occurring before the valves are included in the signals produced by means of the taps and temperature elements 65, 66, 70 and 71. Therefore, the signals produced by the taps and elements 65, 66, 70 and 71 present an accurate measure of the actual conditions of the charge which enters the combustion cylinders.

These signals are substantially precise functions of the number of fuel and air molecules entering the cylinders, since the cylinder displacement, piston speeds and valve motions are known. In addition, the sensing of conditions of the fuel and air immediately prior to their entry into the cylinders helps to reduce control time delay to a minimum because it permits a somewhat direct control loop operation; but of even greater importance from the control viewpoint is that the signals produced are substantially independent of the performance of the engine, permitting a more exact basis for control than other devices, such as those that sense engine exhaust temperatures to produce control signals. It is noted that the charge of a carbureted engine, such as one using gasoline as fuel, may be monitored in the same manner, but by using only one pressure and temperature sensing station since in a carbureted system there is usually a fixed relationship between the volume of air and volume of fuel which is admitted, making the temperature and pressure in a single duct (the mixture manifold) functions of the cylinder charge.

Prior to collecting control data, the engine is first carefully tuned up for optimum performance. If adjustment is required the fuel balance cocks 9 are repositioned to a range which renders the engine easily responsive to control positions of the valve 48 and then carefully adjusted or balanced among themselves to avoid a greater gas charge in one cylinder than in another. The air balance valves 5 are reset, if necessary, to positions open sufficiently to produce the desired air charge in the combustion cylinders at the beginning of the compression stroke. Further adjustments are made upon the fuel balance cocks 9 to balance the average peak firing pressures in the combustion cylinders. Most of the larger gas engines are equipped by the manufacturer with air balance valves and fuel balance cocks; however, in case they are not so provided and adjustment appears necessary, it is noted that all internal combustion engines are adaptable to receive them or comparable charge flow regulators. This includes naturally aspirated, supercharged, and 2 and 4 cycle engines. Inlet and exhaust valve clearances and ignition timing are adjusted for optimum engine operation using data generally supplied by the engine manufacturer.

The air valve 20 is opened to its fully open position during engine data collection operation. This produces the maximum lean mixture that can be obtained corresponding to any given position of the fuel valve 48. The air entering into turbo-charger 3 for delivery to the engine is either artificially or naturally maintained at the maximum ambient or surrounding air temperature anticipated, such as 100 degrees F. This procedure is to establish the upper limit of control at conditions under which the engine finds it most difficult to operate.

With the limiting condition of maximum ambient air temperature and maximum lean mixture the combustion cylinders will develop the minimum peak cylinder firing pressures which can be produced in the engine for any particular setting of fuel valve 48 providing that the volume of fuel introduced with the air produces a mixture which is on the lean side of the ideal or chemically correct mixture. It is noted that most internal combustion engines operate on the lean side of the ideal mixture for economic reasons. Some exceptions are found in engines operating under conditions in which economy is not as important as other factors. In other words, most engines operate on excess air mixtures, and such engines will demonstrate a decrease in combustion cylinder peak pressures with a leaning of the mixtures.

The peak firing pressure in the combustion cylinders is a function of the charge mixture entering the cylinders and the torque and speed under which the engine is operating. Therefore, to produce a particular peak pressure with particular load conditions on the engine it is necessary to feed the combustion cylinders a particular fuel mixture. Inversely, if the combustion cylinders are producing a particular peak pressure, and the engine is operating under particular load conditions, the fuel charge being introduced into the engine can be predicted. Thus, peak firing pressure provides a convenient touchstone for determining engine operating conditions.

Test runs of a prototype engine are made under various conditions of constant torque, constant speed, and constant temperatures of fuel and air. Constant speed is maintained by adjusting the position of fuel valve 48.

The air valve position 21 is varied in increments which traverse the entire range of operation of the air valve 20 and the following data is taken for each position: peak firing pressure, manifold air temperature, manifold air pressure, manifold fuel pressure and rate of fuel consumption. In the instant example the manifold fuel temperature was not taken because the fuel supply remained at a constant known temperature the year around and the variations in temperature due to throttling past valve 48 was felt to be insignificant. However, if the fuel temperature was found to vary significantly, the manifold fuel temperature would be handled in the same manner that manifold air temperature is handled herein.

Figure 4:
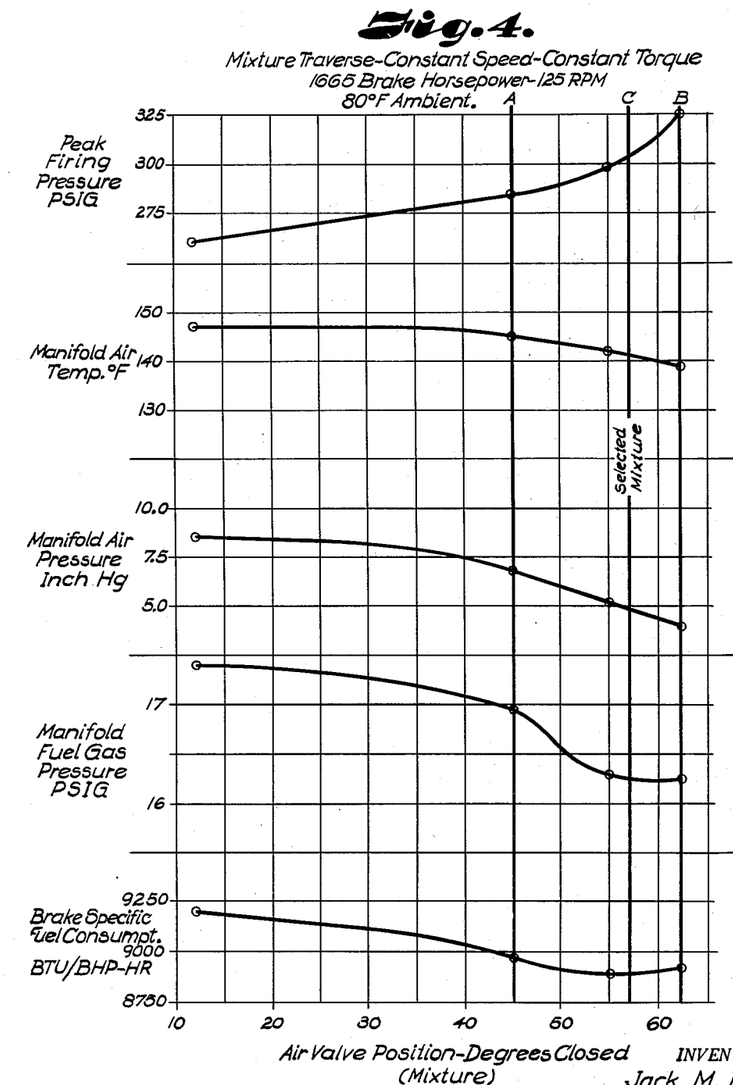
Fig. 4 is a graph of a fuel mixture traverse showing angular positions of the air valve plotted along the horizontal axis with various sets of engine operation information plotted along the vertical axis.

Fig. 4 is a graph of one mixture traverse in which the data are plotted against air valve positions on the horizontal axis. Peak firing pressure in this graph represents the average peak firing pressure of each cylinder with the data for all of the cylinders averaged together. During a mixture traverse the air valve 20 is gradually closed (the angular position 21 increased with respect to the horizontal) until the mixture becomes so rich that the peak firing pressures produce intolerable stresses, that is, a zone where damage to the engine might occur, or, in the alternative the air valve 20 is closed until the rate of engine fuel consumption has reached a minimum value and has started to rise again. The first condition reached, i.e. excessive peak firing pressure or increasing fuel consumption signals the end of that particular traverse. A large number of traverses such as illustrated by Fig. 4 are made using different values of constant speed, constant torque and constant manifold fuel and air ambient temperatures, and graphs similar to that of Fig. 4 are plotted for each set of data.

Since the fuel consumption (seen as Brake Specific Fuel Consumption in Fig. 4) is a rather flat curve, there is quite a broad band in which satisfactory minimum fuel operation can be obtained, such as between lines A and B of Fig. 4. Each vertical line on the traverse, such as lines A and B in Fig. 4, represents a particular peak firing pressure, manifold air temperature, manifold air pressure, and manifold fuel pressure. Therefore, as indicated above, if a peak firing pressure corresponding to one of these vertical lines is maintained at a particular speed and torque, the manifold air pressure and manifold fuel pressure must be at a particular value for one particular manifold air temperature to produce the corresponding mixture. It is noted that in this case the criteria of best fuel consumption was used, however, the method is equally valid for other criteria, such as best acceleration under load (maximum power).

Figure 5:
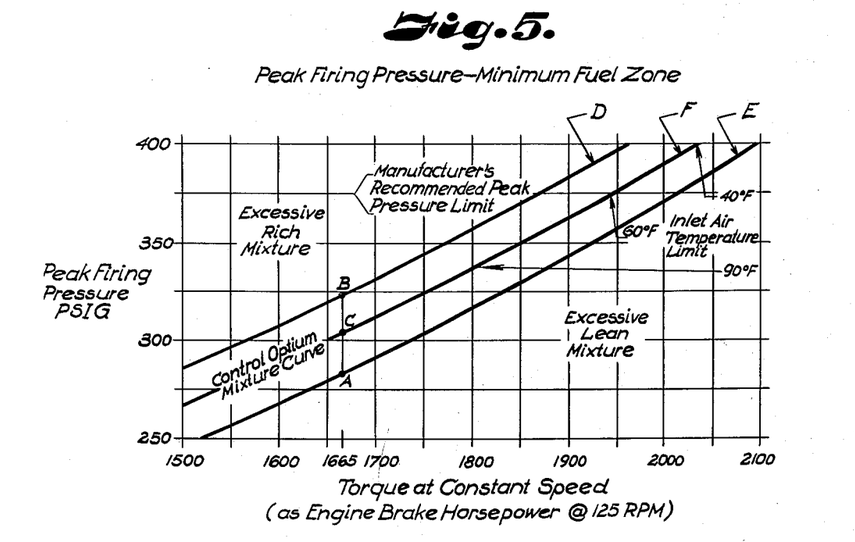
Fig. 5 is a graph of torque at constant speed plotted along the horizontal axis with average peak firing pressures plotted along the vertical axis.

With the graphical data obtained during the mixture traverses plotted in the form of Fig. 4 a new graph is prepared plotting average peak firing pressures on the vertical axis and torque as brake horsepower at a constant speed (in this case 125 r.p.m.) on the horizontal axis, see Fig. 5. A plot is made of the chosen ranges of peak firing pressures which produced the acceptable ranges of minimum fuel consumption at particular torques and at constant speed. In other words, vertical lines are plotted which represent the ranges of satisfactory peak firing pressures at particular torques, see line AB, Fig. 5, which corresponds to the range indicated between lines A and B of Fig. 4. By repeating this process with each of the mixture traverse graphs a band is constructed which represents satisfactory peak firing pressures over the entire range of torques at a particular speed, see the area between lines D and E, Fig. 5. A line drawn through the median of this band represents the precise peak pressures corresponding to the optimum mixture for each torque at a particular speed, line F, Fig. 5. It is noted that the optimum peak pressures cannot be achieved above a certain temperature gradient marked on the grap (Fig. 5), which indicates that the engine will not be able to operate at the selected optimum mixtures at torques and ambient air temperatures above certain limits, due to insufficient air supply from the turbocharger blower 3.

Returning to the mixture traverse graphs represented by Fig. 4, a single vertical line C corresponding to the control optimum mixture curve of Fig. 5 is drawn to represent the selected mixture at the particular conditions described by the traverse graph. Along the vertical line C the manifold air pressure, manifold air temperature and manifold fuel pressure is noted, and if there were a manifold fuel temperature graph, the point of intersection with that line would also be noted. This information is considered valid data for the control program, each set representing one coincident point of optimum operation.

Figure 6:
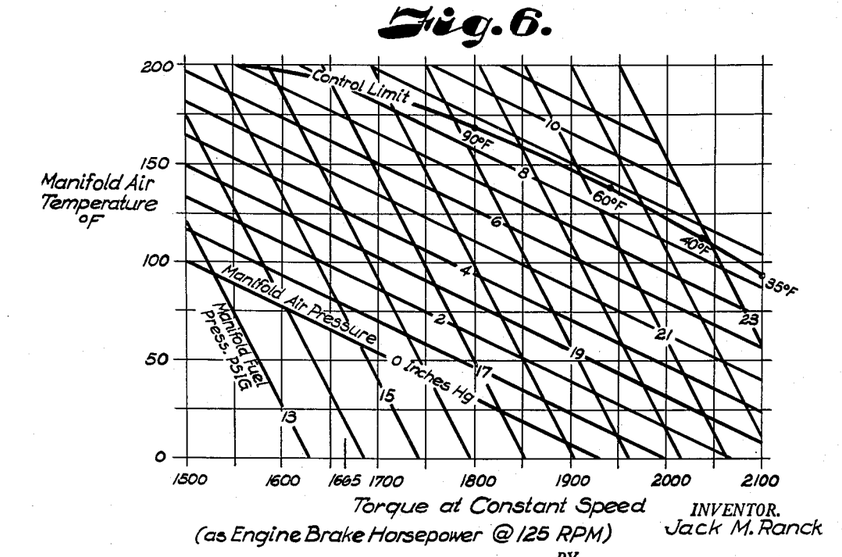
Fig. 6 is a graph of torque at constant speed plotted along the horizontal axis with air manifold temperature plotted along the vertical axis showing a grid of lines satisfying optimum average peak firing pressures at various manifold air pressures and manifold fuel pressures.
Figure 7:
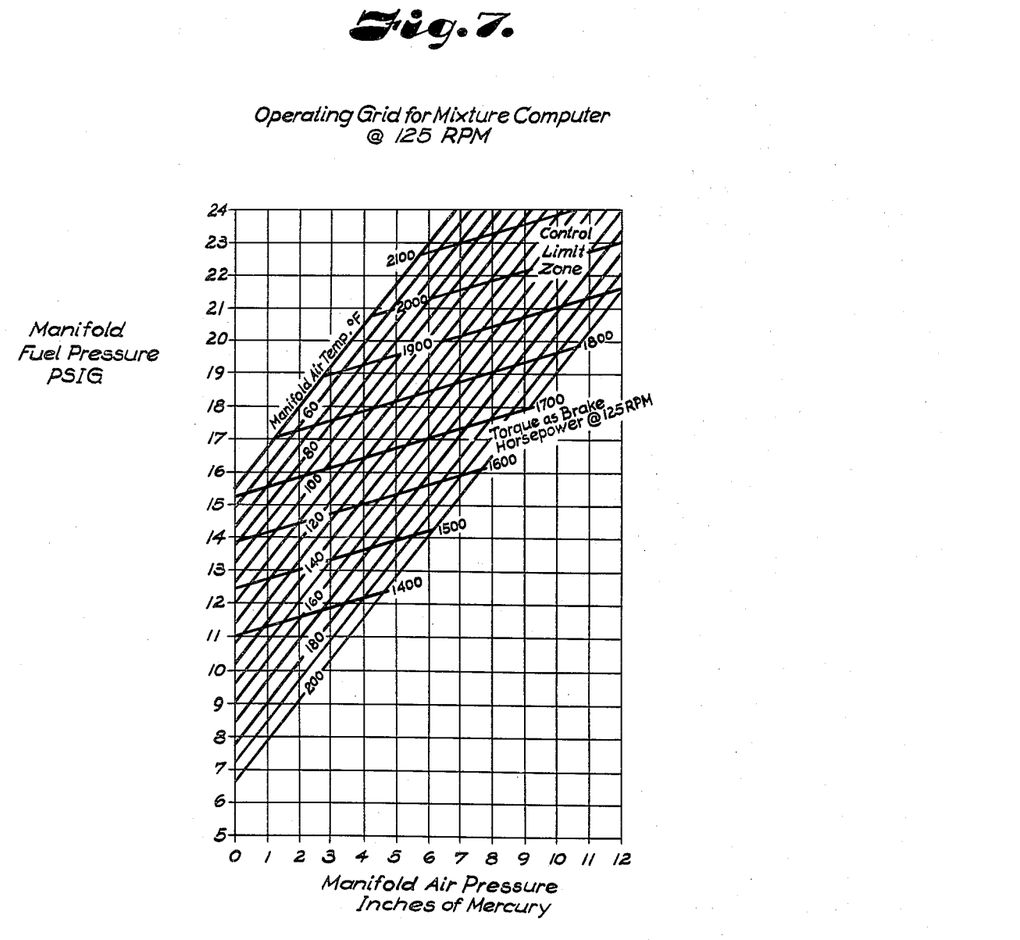
Fig. 7 is a graph of manifold air pressure plotted along the horizontal axis and manifold fuel pressure plotted along the vertical axis showing a grid of lines satisfying optimum average peak firing pressures at various manifold air temperatures and torques at constant speed.

In order to graphically represent these data, manifold air temperature is plotted along the vertical axis and torque at constant speed is plotted along the horizontal axis of a new graph, Fig. 6. Manifold air pressure and manifold fuel pressure are represented as sloping plots of lines and the upper limit of control, that is, above which excessive peak pressures would occur, is noted as the control limit line. To present these data in a more useful form for control purposes manifold fuel pressure is plotted along the vertical axis and manifold air pressure along the horizontal axis of an additional graph, Fig. 7. In Fig. 7 manifold air temperature represents a plot of lines sloping across the grid of manifold fuel pressure vs. manifold air pressure. Therefore, a change in the manifold air temperature represents a shift in the manifold fuel pressure-manifold air pressure grid for a constant torque and speed. Lines of constant torque, which are represented as brake horsepower at 125 r.p.m., are also plotted on this grid, and can be seen to lie on a different slope than the constant temperature lines. The resultant grid illustrated in Fig. 7 represents the program which the engine must follow at 125 r.p.m. and constant manifold fuel temperature to achieve optimum fuel consumption by the chosen criterion of operation.

Further test runs are made with engine speed as the independent variable to determine the affect that this parameter has upon the operating program illustrated by the graph of Fig. 7. Speed differences have different effects on various engines; on a turbo-charged engine a lowering in speed tends to cause the optimum peak pressures at particular torques and ambient conditions to occur at lower manifold fuel pressures.

In order to operate at an optimum mixture condition for different speeds along one of the constant torque lines of Fig. 7, it is, of course, necessary to correct the data for the effects caused by such speed differences since the program of Fig. 7 is valid only at 125 r.p.m. This correction is made in a manner described more fully hereinafter by speed compensation computer 143 cooperating with mixture computer 75.

For ease of control, it is desirable that all these data vary with respect to each other in a substantially linear manner, as they appear to do in this example. Note the lack of curved data lines on the graphs of Figs. 6 and 7. However, as will be more fully apparent hereinafter, if there is substantial non-linearity in any of these relationships, cam actuators may be used in control signal computing devices rather than simple beam actuators as described herein.

By noting any two points along a line of constant manifold fuel pressure on the operating grid (Fig. 7) the rate of change of manifold air temperature with respect to manifold air pressure to achieve optimum operation is obtained. Similarly, by noting any two points along a line of constant manifold air temperature, the rate of change of manifold fuel pressure with respect to manifold air pressure is easily seen. Likewise, on graphs (not shown) the rate of change of engine speed with respect to manifold fuel pressure is obtained, and if felt to be significant, the rate of change of manifold fuel temperature with respect to engine speed can be obtained.

These rates represent the information which the control signal computing devices must recall to achieve the settings of air and fuel valves 20 and 48 which result in the minimum fuel consumption for any value of torque, speed or ambient conditions under which the engine is called upon to operate.

Figure 2:
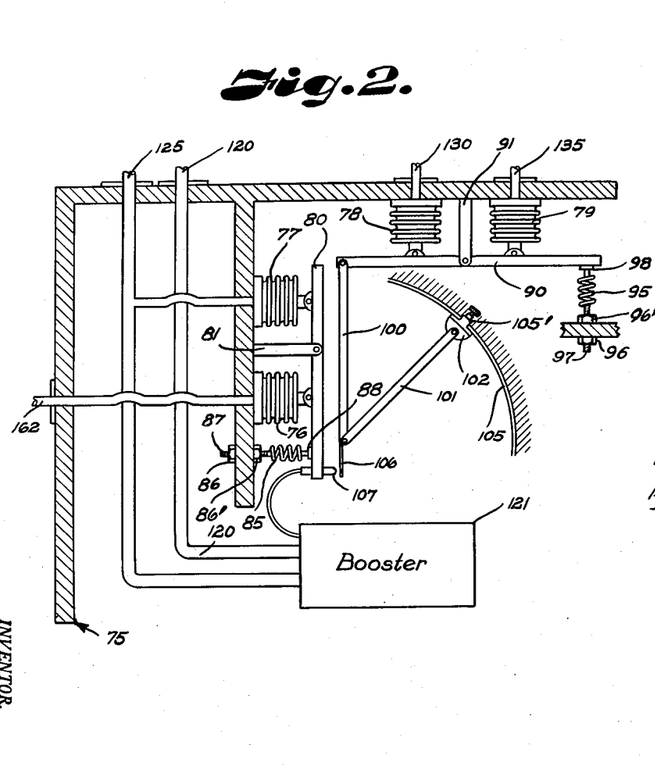
Fig. 2 is a diagrammatic view of a pneumatic, differential force balance bridge device used as a mixture control or speed control signal computer.

Referring now to the control system in detail, 75 represents a mixture computer, see Fig. 2. The mixture computer 75 is a pneumatic, force balance bridge device which includes input and output bellows producing mechanical forces when fluids under pressure are introduced therein. There are three input bellows 76, 78 and 79 and one output bellows 77. Bellows 76 and 77 are mechanically opposed to each other on beam 80 which is pivotally mounted upon a support 81 positioned between the bellows 76 and 77. A spring 85 is axially adjustable by rotating nuts 86 and 86' on threaded spring extension 87 to bias beam 80 either clockwise or counterclockwise through a spring connection 88. The bellows 78 and 79 oppose each other upon a beam 90 which is pivotally mounted upon a support 91 positioned between the bellows 78 and 79. A spring 95 is axially adjustable by rotating nuts 96 and 96' on threaded spring extension 97 to bias the beam 90 either clockwise or counterclockwise through a spring connection 98. The beam 90 on the opposite end from spring 95 is pivotally connected to a link 100 which, at the opposite end thereof, is pivotally connected to a link 101. The link 101 is pivotally fixed to an anchor 102 which is adjustably retained in position along an arcuate path 105 by a suitable locking device 105'. Link 100 carries a vane 106 on the end adjacent the link 101 adapted to contact a nozzle 107 which is carried on the corresponding end of beam 80.

Air from a suitable source of supply enters a pressure regulator 140 (Fig. 1) which is of the common type responsive to downstream pressure, and operative to maintain substantially constant downstream pressure at which it is adjustably set. An instrument pressure supply line 120 feeds air from regulator 140 into a booster relay 121 which is a pneumatic amplifier such as is described in Patent No. 2,737,963 (Fig. 5 therein). Booster 121 shunts air into mixture computer output tube 125 so long as air is allowed to bleed out of nozzle 107 below a certain rate. As the pressure in tube 125 increases, bellows 77 applies a greater force on to beam 80, tending to move nozzle 107 away from vane 106 until the balanced rate of flow out of nozzle 107 is reached. If vane 106 moves too far away from nozzle 107, the bleed rate therefrom increases above said certain rate and the pressure in tube 125 is decreased by booster 121 until bellows 77 collapses to the point where nozzle 107 has been displaced close enough to vane 106 to bleed at the balanced rate, establishing a balanced position.

It is apparent that signals in the form of fluid pressures fed into bellows 76, 78 and 79 will have an effect on the relative positions of vane 106 and nozzle 107 and that the booster 121 will vary the pressure in output tube 125 until a balance point is reached. It is further apparent that by changing the position of anchor 102 along the arcuate path 105, the rate of change of the position of vane 106 is changed with respect to the unit change in the difference of the pressure signals introduced into bellows 78 and 79.

As indicated above, the data which has been collected is used to determine the rates of change of the operating parameters with respect to each other to achieve the minimum fuel consumption at the particular conditions under which the engine is called upon to operate. The pressure tap 71 introduces the manifold air pressure through tube 130 into the bellows 78. Since an increase in manifold air pressure tends to be balanced by an increase in manifold air temperature for maintaining a constant manifold air charge, a signal pressure directly proportional to an increase in manifold air temperature is introduced into bellows 79 in opposition to bellows 78. The desired correction for variations in manifold air temperature is expressed mechanically in the computer 75 by introducing into the bellows 79 a pressure signal which varies with manifold air temperature at a rate corresponding to the rate of change of manifold air temperature to manifold air pressure along any constant manifold fuel pressure line in Fig. 7. To accomplish this the signal from the temperature sensing element 70, which is a gas or liquid filled bulb, is introduced into a temperature transmitter 133 through a tube 134. The transmitter 133, which is described in Patent No. 2,737,963 (Fig. 2 therein), is calibrated to produce the said variable pressure signal corresponding to manifold air temperature and transmit it, through tube 135, to the bellows 79. An air supply regulator 136 similar to the regulator 140 described above feeds air at a suitable pressure into the transmitter 133 from supply tube 120 to provide instrument operating pressure.

With the manifold air pressure and the corresponding manifold air temperature signal described by any point on the operating grid (Fig. 7) introduced respectively into bellows 78 and 79, and if necessary, by adjusting the bias of spring 95, the beam 90 is balanced. A change in manifold air temperature or pressure then produces an unbalance in beam 90 at the desired rate for correcting the change in air density due to said changes; in effect resetting the computer to a balance point represented by the intersection of any line of constant manifold air pressure with the corresponding manifold air temperature line on the operating grid (Fig. 7).

For computer 75 to produce a control signal corresponding to a point on the operating grid, the rate of variation of manifold air temperature with respect to changes in manifold fuel pressure must be expressed therein. Assuming, for the moment, that the manifold fuel pressure is introduced into bellows 76, the said rate of variation is obtained in the computer 75 by adjusting the position of the anchor 102 (Fig. 2) along the arcuate path 105. To elaborate, a unit change in manifold air temperature corresponds to a proportional change in manifold fuel pressure (Figs. 6 and 7). The equivalent of this proportional relationship is easily expressed in the computer 75 by setting the arcuate position of anchor 102 so that the mechanical force or advantage produced by links 101 and 102 on vane 106 is in this proportional relationship with the force produced at bellows 79 due to the manifold air temperature signal. Manifold air temperature and manifold fuel pressure will thus vary with each other in accordance with the operating grid (Fig. 7).

A pressure signal is placed in bellows 77 to represent a zero or neutral position above or below which a correction in air valve setting is called for, for example, 10 p.s.i. A gas manifold pressure corresponding to the point on the operating grid described by the pressure in bellows 78 and 79 to produce balance in beam 90 is introduced into bellows 76 and, if necessary, spring 85 is adjusted to bias beam 80 until the computer 75 is in balance, i.e., when the 10 p.s.i. pressure in bellows 77 results in the nozzle 107 bleeding at the proper rate.

A change in pressure in any one or combination of the bellows 76, 78 and 79 will cause the vane and nozzle, 106 and 107, to tend to move with respect to each other which necessitates a change in pressure in bellows 77 (by booster 121), to achieve balance. The change in pressure in bellows 77 is reflected in tube 125 which, through mixture driver relay 30 and air valve control 22 results in changing the position of air valve 20.

Up to this point the mixture computer 75 has considered only the operating grid of Fig. 7 which is valid only at a speed of 125 r.p.m. To correct the output of computer 75 for operation at different speeds a compensating factor must be impressed on the fuel manifold pressure signal entering bellows 76. It is noted that a correction for fuel manifold temperature changes, if any, may also modify the signal entering bellows 76.

The pressure signal which is introduced into bellows 76 of mixture computer 75 is produced by a speed compensation computer 143 which is identical in design to mixture computer 75 and contains booster 121'. The speed of the engine is sensed by the hydraulic tachometer 11 which produces a corresponding pressure signal transmitted through tube 145 to bellows 147. The temperature of the gas in gas manifold 8 is measured by the temperature sensing element 65 which is identical with element 70 and the signal pressure produced is fed through the tube 150 into a temperature transmitter 151, which is identical in design to temperature transmitter 133, except that the signal produced by temperature transmitter 151 is inverted for reasons appearing hereinafter so that the signal output pressure will decrease with increasing temperature. The rate of pressure change with respect to temperature change of output of temperature transmitter 151 is determined in the same manner as with transmitter 133, to express the rate of variation of manifold fuel temperature with the variation in output of tachometer 11 in accordance with engine speed. Supply pressure for temperature transmitter 151 is obtained from instrument pressure supply tube 120 through an air pressure regulator 153 similar to the regulator 140. The inverted output pressure of temperature transmitter 151 is fed through tube 155 to bellows 156 which opposes speed signal bellows 147.

A pressure tap 66 in the gas manifold communicates through tube 158 to bellows 160. After calibrating computer 143 in the same manner as computer 75, the temperature and pressure of the gas in the gas manifold 8 and the speed of the engine through tachometer 11 produce signals in bellows 147, 156 and 160 of speed compensation computer 143, which in turn produces a modified gas manifold pressure signal which is fed through tube 162 into the bellows 76 of the mixture computer 75.

The characteristics of the engine will determine the effect which reduced speed has upon the engine program (operating grid of Fig. 7). In this example, as mentioned above, due to reduced turbocharging and other effects the optimum operating conditions described by any point on the operating grid will actually occur at a lower manifold gas pressure than indicated. A reduction in engine speed produces a reduction in pressure in the bellows 147 which is reflected in an increase in the pressure delivered by computer 143 to bellows 76 of computer 75 to provide the necessary corrected manifold fuel pressure signal. This produces, in effect, a new operating grid for computer 75 to follow which is valid at the reduced speed.

An increase in manifold gas temperature tends to be compensated by an increase in manifold gas pressure since temperature expands the gas, diluting the charge. Therefore, by inverting the manifold gas temperature signal introduced into bellows 156 and opposing bellows 156 with the engine speed signal in bellows 147, a balance can be obtained as with bellows 78 and 79 of the mixture computer 75. The manifold fuel pressure introduced into bellows 160 of computer 143 is thus corrected for engine speed and manifold fuel temperature before it is used for computing the control signal produced by the mixture computer 75.

Speed compensation computer 143 and mixture computer 75 have been described as separate means, however, it is apparent that these devices could be contained within one incasement as a single signal producing means.

Tube 145, which carries the engine speed signal from the hydraulic tachometer 11 to the speed compensation computer 143, also carries this signal to chamber 163 of speed driver relay 55 which produces the control pressure in fuel valve control 51. Relay 55 is shown in detail in Fig. 3. Instrument pressure supply tube 120 feeds relay 55 at the bottom inlet 165 into chamber 166. A pressure signal from the supervisory control panel 170, which will be described in detail hereinafter, enters chamber 172 of the relay 55 from tube 173. Chamber 172 and 163 are separated by a flexible diaphragm 175 and chambers 166 and 176 are also separated by a flexible diaphragm 177. Flexible bellows seals 178 and 179 provide flexible seals around rod 180, which is axially moveable with diaphragms 175 and 177. Resilient support for the rod 180 is provided by spring 181. The rod 180 will move in an axial direction according to the sum of the differences in pressures between chambers 172 and 163, and chambers 166 and 176. If the total force on the rod 180 is in a direction toward the bottom of relay 55, the end 182 of rod 180 presses downwardly upon a pivoted beam 183 which opens valve 184 to admit instrument pressure supply air into chamber 166. Conversely, if the total force on rod 180 is toward the top of relay 55, the beam 183 is pivoted in the opposite direction by means of spring 183' and opens valve 185 which releases air from chamber 166. A difference in air pressure between chambers 176 and 166 will cause air to bleed through tube 186 toward the chamber with the lower pressure, and at a rate determined by the setting of needle valve 187.

Figure 3:
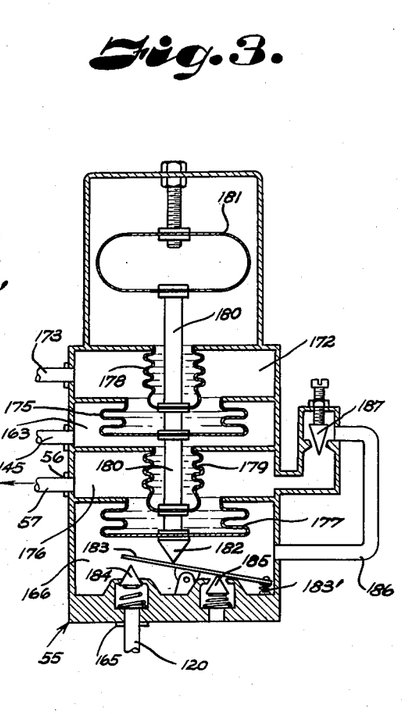
Fig. 3 is a diagrammatic view of a differential proportional pneumatic force balance device used as a signal amplifying relay for driving a control valve.

Speed driver relay 55 is commonly known as a relay with proportional floating output; that is, the rod 180 floats about some set point, and a change in signal in chambers 163 or 172 produces a changing pressure in chamber 176 until balance is restored between chambers 163 and 172. Thus, a change in speed of the camshaft 4 produces a change in signal output of hydraulic tachometer 11 which shows up in chamber 163 of relay 55. Assuming this change in signal is an increase in pressure due to a speeding up of the engine, the rod 180 is moved axially toward spring 181 causing valve 185 to open, lowering the pressure in chamber 166. Air bleeds from chamber 176 past needle valve 187, decreasing the pressure in tube 57, which results in moving the gas valve 48 in a closing direction, reducing the quantity of fuel entering the gas manifold 8 and thereby slowing down the engine. The rate of change of pressure in chamber 176 and hence the speed of gas valve control is determined by the rate of bleed past valve 187, for the pressure in chamber 176 cannot substantially change except due to flow past needle valve 187. A slowing of the engine will lower the pressure in chamber 163, closing valve 185. A decrease in engine speed causes a valve 184 to open, increasing the pressure in chamber 176.

The mixture driver relay 30 is an identical instrument to speed driver relay 55.

It may be observed that the speed control network independently controls speed, but as it does, it must produce a richer or leaner mixture to accelerate or decelerate the engine. This action affects the mixture computer control function which readjusts the air intake to achieve the correct mixture. If the rates of response of speed control and mixture control were equally fast (in phase) a mutual response or "hunting" would occur. To prevent this the bleed rate past valve 187 in speed driver relay 55 is set much higher than the same bleed valve rate in mixture driver relay 30 in order that speed control will occur much faster than mixture control. The difference in rates places a large phase shift between speed and mixture control so that "hunting" between networks is virtually eliminated, stabilizing the combined engine control action.

The engine is called upon to operate at a specific speed through supervisory control panel 170 by setting speed control knob 190 to a predetermined position. Knob 190 is operatively connected to a pressure regulator 191, similar to regulator 140, which controls the pressure of the air in chamber 172 of speed driver relay 55 through tube 173. Indicator pointer device 193 through conventional means (not shown) indicates the pressure in tube 173 and, hence, in chamber 172. A branch of the tube 145 which carries the pressure signal of hydraulic tachometer 11 is connected to an indicator pointer device 195 which, through conventional means (not shown), visually indicates the pressure in line 145 which is directly related to the speed at which the engine is running.

The output of the mixture computer 75 is carried through tube 125 into chamber 197 of the mixture driver relay 30 which corresponds to chamber 163 of the speed driver relay 55. The upper chamber of mixture driver relay 30 corresponding to chamber 172 of Fig. 3, receives a reference pressure signal through tube 200 which is controlled by supervisory control panel 170. Program control knob 201 of supervisory control panel 170 is operatively connected to a pressure regulator 202 similar to regulator 140 which maintains the reference pressure in tube 200. Indicator pointer device 204 through conventional means (not shown) visually indicates the pressure in line 200.

A four-way tube fitting 206 carries a branch tube 207 from mixture computer output tube 125 which is connected to an indicator pointer device 208 which, through conventional means (not shown), indicates the pressure in tube 125.

Pointer device 208 offers a visual indication of the mixture computer output signal which is useful in determining whether the engine is operating under the desired control conditions. If the pressure output of the mixture computer 75 (pressure in tube 125) falls below a certain predetermined value, it indicates that dangerous peak cylinder firing pressures may have been reached, and safety valve 33 deactuates, venting the air out of chamber 40 of the air control valve, opening air valve 20 to its maximum position to lean the mixture and thus reduce the peak firing pressures.

During the normal operation of the engine, wear occurs on the valves and other areas, which tends to cause the engine's calibration to shift to different values of manifold air pressure without appreciable relative rate changes therein. By observing the actual peak pressures in the combustion cylinders and adjusting program control knob 201 to introduce a new reference pressure in tube 200, the mixture program can be changed to produce the desired peak pressure at new control points on the data grid. Since the rates of change are substantially unaffected by such adjustment, the optimum operation of the engine over the entire range is still maintained; thus by simply adjusting knob 201, wear compensation is achieved. When such wear occurs in the engine to produce noticeable errors in operation, manual balance valves 5 and 9 are re-positioned until correct peak pressures are obtained at the correct control settings.

In starting the engine, there is a zero fuel manifold pressure, since there is no fuel in the gas manifold. However, there is a small pressure in the air manifold produced by the starting speed of the turbo-charger blower. The program of the control system will not be balanced by these conditions, because with zero fuel pressure the mixture computer will be asking for less air to achieve balance. To overcome this, the control system is allowed to go out of balance deliberately. The air control valve is, for this reason, cropped of 12% of its area, whereby at full closed position 12% of the valve still remains open to allow in sufficient air for starting, although the mixture computer is calling for the full closed position.

In order to briefly illustrate the operation of the engine control system, it is assumed that, during engine operation at a particular speed and load, the load is increased. The engine slows down, reducing the signal output pressure of tachometer 11. This collapses bellows 147 on computer 143 (corresponding to 78, Fig. 2), rotating the balance beam (corresponding to 99, Fig. 2) clockwise, lowering the nozzle bleed rate. The booster 121' increases the pressure in tube 162 until the output bellows (corresponding to 77, Fig. 2) shifts the balance beam (corresponding to 80, Fig. 2) to reestablish the correct bleed rate. The reduced pressure from tachometer 11 also causes a reduced pressure in chamber 163 of the speed driver relay 55. This causes an increase in pressure in chamber 176 which is introduced into chamber 59 of the fuel control valve, opening same to allow more gas to enter the engine, bringing engine speed back to its former value. The said increased pressure in tube 162 is introduced into bellows 76 of the mixture computer 75, causing counterclockwise rotation of beam 80 and decreasing the bleed rate from nozzle 107. The booster 121 increases the pressure in tube 125 until the bellows 77 returns the beam 80 to a position which allows the correct bleed rate from nozzle 107. The increased pressure in tube 125 enters chamber 197 of mixture driver relay 30 (corresponding to 163, Fig. 3) causing a decrease in the pressure in tube 37 which reduces pressure in chamber 40 of the air control valve. This decrease is overcome by spring 43 which axially moves rod 42 to further open air valve 20, reestablishing the correct mixture.

It is thus apparent that I have described an engine control system which maintains the proper air-fuel relationship taking into consideration the effects of manifold fuel pressure, manifold air pressure, manifold air temperature, manifold fuel temperature and engine speed. It is to be understood that while I have illustrated and described one form of my invention it is not to be limited to the specific form or arrangement of parts herein described and shown, except insofar as such limitations are included in the claims.

What I claim and desire to secure by Letters Patent is:

1. In an air-fuel ratio control system for an internal combustion engine having separate air and fuel flow passages comprising, an air flow regulating control in said air passage to regulate air pressure downstream therefrom and a fuel flow regulating control in said fuel passage to regulate fuel pressure downstream therefrom, means responsive to the regulated fuel pressure; means responsive to the temperature of the regulated air; an engine driven means responsive to the speed of said engine; said fuel flow control being actuated by the response of said driven means; signal producing means being actuated by the responses of said driven means and said means responsive to the regulated fuel pressure and said means responsive to the regulated air pressure and said means responsive to the temperature of the regulated air, the signal produced by said signal producing means actuating said air flow control.

2. The system of claim 1 further including means responsive to the temperature of the regulated fuel and in which said signal producing means is actuated by the responses of said driven means and said means responsive to the regulated fuel pressure and said means responsive to the temperature of the regulated air and said means responsive to the temperature of the regulated fuel.

3. In an air-fuel ratio control system for an internal combustion engine having separate air and fuel manifolds comprising, an air flow regulating control for regulating air pressure in said air manifold and a fuel flow regulating control for regulating fuel pressure in said fuel manifold; means responsive to the regulated air pressure in said air manifold; means responsive to the temperature of the regulated air in said air manifold; an engine driven tachometer for producing a speed signal; said fuel flow regulating control being actuated by the response of said tachometer; a first signal producing means being actuated by the response of said tachometer and the response of said means responsive to the fuel pressure in said fuel manifold; a second signal producing means being actuated by the signal of said first signal producing means and the response of said means responsive to the regulated air pressure in said air manifold and said means responsive to regulated air temperature in said air manifold; the signal produced by said second signal producing means actuating said air flow regulating control.

4. The system of claim 3 further including means responsive to the regulated fuel temperature in said fuel manifold and in which said first signal producing means is actuated by the response of said tachometer and the response of said means responsive to the regulated fuel pressure in said fuel manifold and the response of said means responsive to the temperature of the regulated fuel in said fuel manifold.

5. The system of claim 3 including a program control means adjustable to produce reference signals; a differential means adapted to respond to both the signal produced by said second signal producing means and the reference signal produced by said program control means to produce a signal for actuating said air flow regulating control.

6. In an air-fuel ratio control system for an internal combustion engine having separate air and fuel manifolds comprising, an air flow regulating control for regulating air pressure in said air manifold and a fuel flow regulating control for regulating fuel pressure in said fuel manifold; an engine driven tachometer responsive to the speed of said engine for producing a speed signal, said fuel flow control being actuated by said speed signal for controlling the fuel flow in response to variations in the speed of said engine; means responsive to the fuel pressure in said fuel manifold; means responsive to the air temperature in said air manifold; means responsive to the air pressure in said air manifold; a first multi-input balance bridge means adapted to produce a signal in response to said speed signal and the response of said fuel pressure responsive means; a second multi-input balance bridge means adapted to produce a signal in response to the signal of said first multi-input means and the responses of said air pressure and air temperature responsive means; said signal of said second multi-input means actuating said air flow regulating control.

7. The system of claim 6 including means responsive to the fuel temperature in said fuel manifold, said first multi-input means being adapted to respond to said speed signal and the response of said fuel pressure responsive means and the response of said fuel temperature responsive means.

8. In an air-fuel ratio control mechanism for an internal combustion engine operating on a primarily gaseous fuel and having separate air and gas manifolds comprising, an engine driven tachometer for producing a signal in proportion to the speed of the engine; valve means adjustable in position to control the gas pressure in said manifold and thus the speed of the engine; means for producing a signal corresponding to the desired speed of the engine; a speed driver relay adapted to control the operating position of said manifold gas pressure valve means in response to the signal produced by said tachometer and the signal corresponding to the desired speed of the engine; a first signal producing computer means, temperature and pressure responsive means in said gas manifold for producing signals corresponding to the gas pressure and the gas temperature in said gas manifold; said manifold gas temperature signal and said manifold gas pressure signal and said tachometer signal being respectively introduced into said first computer means, said first computer means producing a signal corresponding to engine speed and temperature corrected fuel manifold pressure; a second signal producing computer means; temperature and pressure responsive means in said air manifold for producing signals corresponding to the air pressure and air temperature in said air manifold, said manifold air pressure signal and said air manifold temperature signal and said signal produced by said first computer means being respectively introduced into said second computer means; said second computer means producing a signal corresponding to engine speed and temperature corrected fuel manifold pressure and manifold air temperature and manifold air pressure; valve means adjustable in position to control the air pressure in said air manifold; a mixture driver relay adapted to control the operating position of said manifold air pressure valve means; a signal producing means for producing a mixture reference signal, said reference signal and said signal produced by said second computer means being respectively introduced into said mixture driver relay for controlling same whereby the air-fuel ratio and the speed of said internal combustion engine is automatically controlled.

9. The method of controlling the air-fuel mixture delivered to an internal combustion engine having separate fuel and air regulating means for regulating the fuel pressure and air pressure respectively comprising, sensing the regulated fuel pressure, producing a signal corresponding to said fuel pressure, sensing the speed of the engine, producing a signal corresponding to said engine speed, regulating the fuel flow delivered to the engine in response to said speed signal, producing a first signal in response to said speed signal and said fuel pressure signal, sensing the regulated air pressure, producing a signal corresponding to said regulated air pressure, sensing the regulated air temperature, producing a signal corresponding to said regulated air temperature; producing a second signal in response to said air temperature signal and said air pressure signal and said first signal for controlling the air flow regulating means.

10. The method of claim 9 including the steps of sensing the regulating fuel temperature, producing a signal corresponding to said fuel temperature and modifying said first signal with said fuel temperature signal.

References Cited in the file of this patent

UNITED STATES PATENTS

| | | |
|---|---|---|
| 2,245,562 | Becker | June 17, 1941 |
| 2,669,982 | Schowalter et al. | Feb. 23, 1954 |
| 2,744,511 | Kauffmann et al. | May 8, 1956 |